United States Patent [19]
Larriberot et al.

[11] Patent Number: 5,634,307
[45] Date of Patent: Jun. 3, 1997

[54] IMITATION STONE SURFACE APPARATUS AND METHOD

[76] Inventors: Jean-Paul Larriberot, 1020 Ina Dr.; John L. Krisman, 3160 Lunada La., both of Alamo, Calif. 94507

[21] Appl. No.: 403,074

[22] Filed: Mar. 13, 1995

Related U.S. Application Data

[63] Continuation-in-part of Ser. No. 190,684, Feb. 1, 1994, abandoned, which is a continuation of Ser. No. 775,271, Oct. 11, 1991, abandoned.

[51] Int. Cl.⁶ .......................... B32B 15/00; B32B 31/00
[52] U.S. Cl. ........................... 52/314; 52/316; 52/318
[58] Field of Search .............................. 52/314, 316, 318

[56] References Cited

U.S. PATENT DOCUMENTS

| | | |
|---|---|---|
| 2,095,642 | 10/1937 | Knight . |
| 2,595,142 | 4/1952 | Herck . |
| 2,850,890 | 9/1958 | Rubenstein . |
| 2,951,006 | 8/1960 | Rubenstein . |
| 3,097,080 | 7/1963 | Weir . |
| 3,145,502 | 8/1964 | Rubenstein . |
| 3,150,032 | 9/1964 | Rubenstein . |
| 3,457,133 | 7/1969 | Barnette . |
| 3,546,832 | 12/1970 | Smith . |
| 3,930,088 | 12/1975 | Constantin et al. . |
| 4,025,683 | 5/1977 | Meader, Jr. et al. . |
| 4,248,816 | 2/1981 | Sheridan . |
| 4,497,114 | 2/1985 | Belcher . |
| 4,784,821 | 11/1988 | Leopold . |
| 4,847,026 | 7/1989 | Jarboe et al. . |
| 4,908,257 | 3/1990 | Baskin . |
| 4,956,030 | 9/1990 | Baskin . |
| 5,004,512 | 4/1991 | Fodera . |

OTHER PUBLICATIONS

"Polyacrylate resin," McGraw–Hill Encyclopedia of Science & Technology, vol. 14, pp. 130–131 (1992).

The Alston's Handy Helpers catalogue for Autumn, 1994, at p. 51, discloses a Walk Maker apparatus and method for simulated and brick pathways.

The Jul. 7, 1993 Memorandum entitled "Concrete Waterproofing of California", by Xypex Chemical Corporation, discloses the technical data of the Xypex Concentrate Admix product.

The Jan., 1994 Xypex Chemical Corporation advertisement provides information on the Concentrate Admix C–2000 product.

*Primary Examiner*—Wynn E. Wood
*Attorney, Agent, or Firm*—Flehr Hohbach Test Albritton & Herbert

[57] ABSTRACT

A stone-like coating is applied to architectural structures to closely simulate stonework both as to appearance and feel, the coating being applied in successive layers, with the outer surface of the coating being sculpted, configured or colored to imitate the appearance of stonework. The coating is provided by an aqueous composition comprising about one part by weight portland white cement, about 0.9 to 1.1 parts by weight white silica sand, about 1.8 to 2.2 parts by weight limestone sand, and about 0.9 to 1.1 parts by volume acrylic liquid solution. The aqueous composition is capable of being adhered to an exterior surface of a structure, and, upon curing, solidifies into a layer of stone-like composition exhibiting high compressive strength.

13 Claims, 2 Drawing Sheets

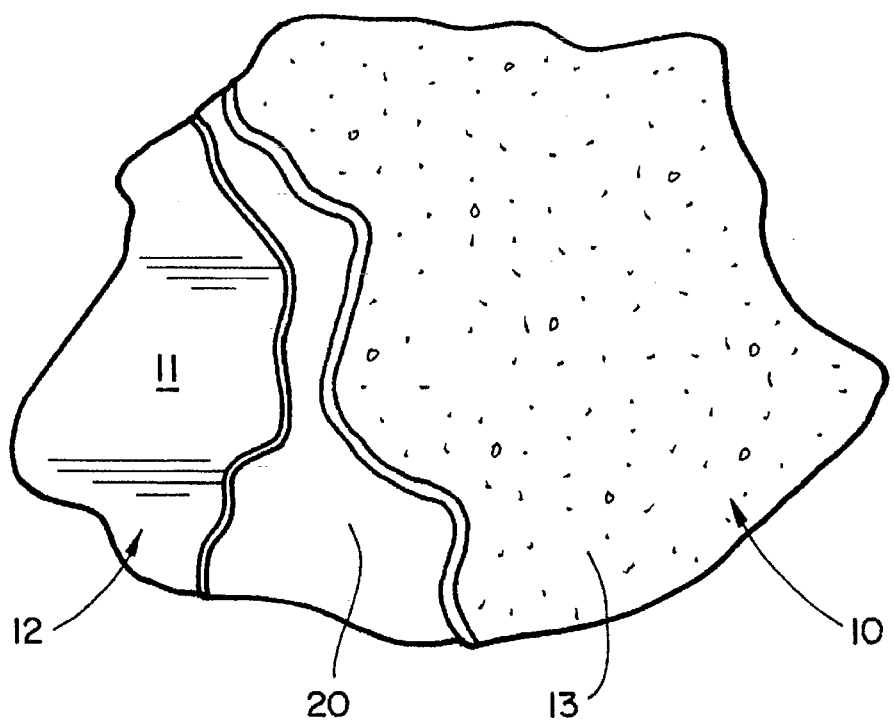
FIG_1
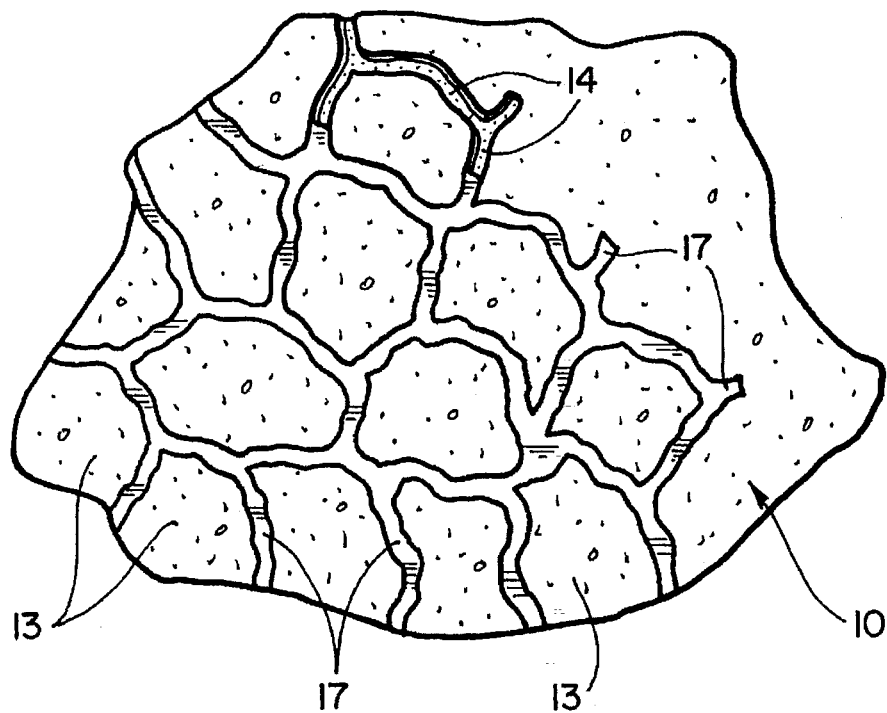
FIG_2

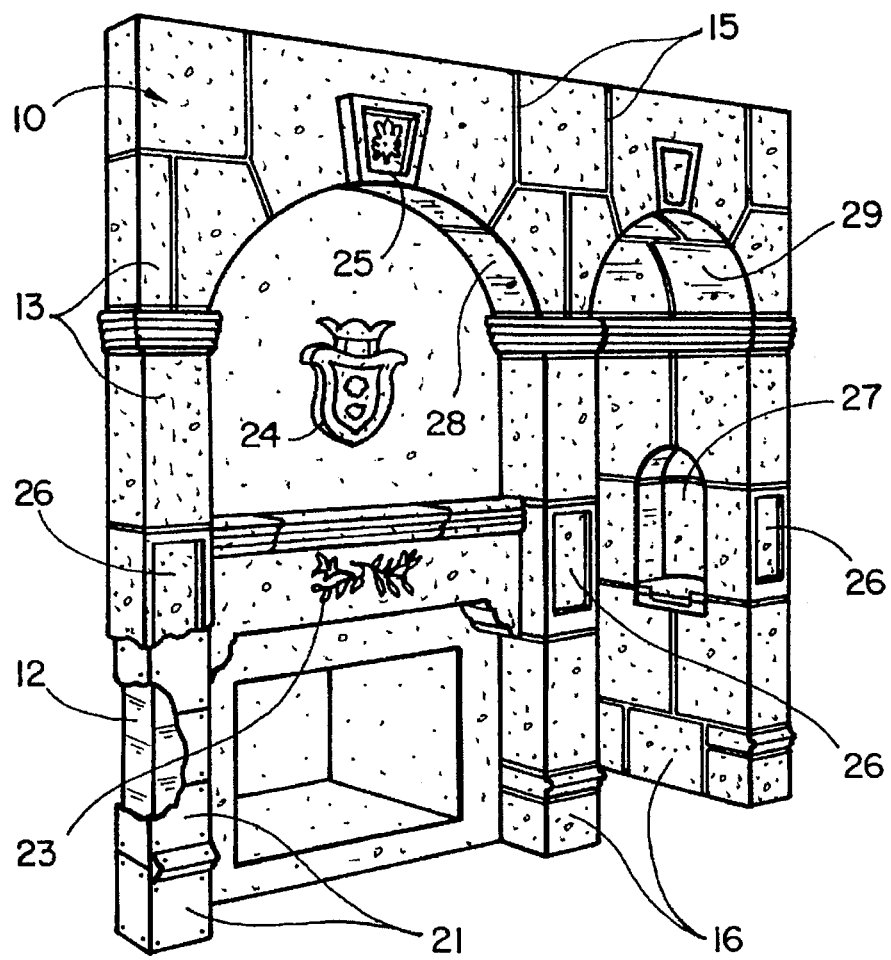
FIG_3
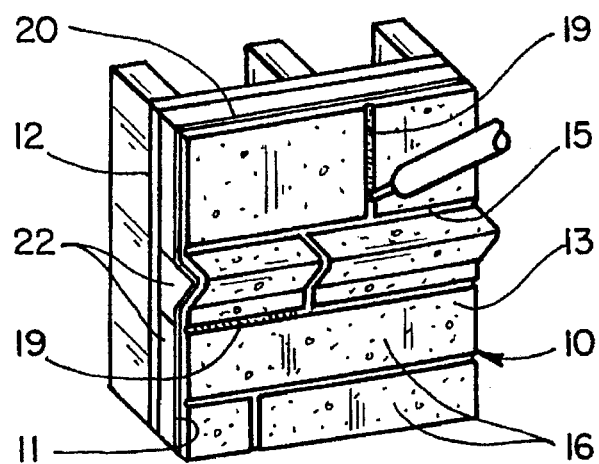
FIG_4

IMITATION STONE SURFACE APPARATUS AND METHOD

RELATED APPLICATION

This application is a continuation-in-part application based upon application Ser. No. 08/190,684, filed Feb. 1, 1994, and entitled FORMING IMITATION STONE SURFACES ON ARCHITECTURAL STRUCTURES PULL DOWN STORAGE SHELF ASSEMBLY, which is a continuation application of parent application Ser. No. 07/775,271, filed Oct. 11, 1991, now abandoned, and incorporated by reference herein in its entirety.

TECHNICAL FIELD

This invention relates to providing imitation stone surfaces on architectural structures, and more particularly to methods and techniques for creating such imitation stone surfaces.

BACKGROUND ART

Solid stonework has long been used in architecture for accomplishing beautiful and interesting visual effects. However, most stonework employed in architecture is difficult and expensive to use. Highly skilled stone masons are required to properly cut, fit and install natural stone surfaces in a time-consuming and expensive procedure.

Architectural features of stone, such as walls, floors, mantels, arches, balustrades, urns and other decorative architectural features are not only time-consuming and expensive to construct, but also are so heavy that very strong architectural structures are required to support them.

A few attempts have been made to give architectural features a stone-like appearance. Prominent among these is the application of a relative thin veneer of stone, such as fieldstone, to existing walls. The fieldstone veneer is heavy, difficult to apply, and breaks rather easily. The sections of fieldstone veneer must be manufactured in slabs in a plant constructed for that purpose. The visual quality of fieldstone veneers is limited by the appearance of the stone itself.

Other attempts have been made to give walls and floors a simulated stone-like surface by casting stabs of concrete or resin with small stones or imitation plastic stones cast into the exposed surface when the slab is installed. Typical examples of such prior art precast slab construction are those disclosed in the U.S. Pat. Nos: 3,097,080; 3,457,133; 3,456,832; 3,930,088; 4,248,816; 4,784,821; 4,847,026; 4,908,257; 4,956,030; and 5,004,512.

Still other simulated stone techniques involve on-site formations of concrete or resin applied over the existing architectural structures. One disadvantage with these techniques, however, is that the simulated stone surface tend to appear unrealistic. Often, the bonding agents employed, such as cement and/or plasticizers, tend to overwhelm the aggregate stone and detract from their natural graininess texture and appearance. Hence the authenticity and patina of the simulated surface are more questionable upon closer inspection. These applications, moreover, typically require several days for curing which renders the treated surface unusable for a substantial period of time.

Another problem associated with these on-site formations is that thinner layers of application tend to crack and break away from the underlying surface, since the compressive strength is typically under 3000 psi. To compensate for this general lack of strength, thicker layers of at least a two inches are required to endure the normal loads applied to the surface during everyday use. Accordingly, the exterior surface of the simulated stone may be higher or stand out more than desired.

Finally, the material compositions of the prior art simulated stone surfaces tend to be excellent heat sinks due to absorption. This property is disadvantageous on extremely hot days in that these simulated stone surfaces are unbearable to contact without some form of footwear protection. Typical on-site formation simulated stone surface prior art is that disclosed in the U.S. Pat. Nos: 2,095,642; 2,595,142; 2,850,890; 2,951,006; 3,145,502; 3,150,032; 4,025,683; and 4,497,114.

DISCLOSURE OF INVENTION

Accordingly, it is therefore a general object of the present invention to provide a technique, method and product capable of closely simulating appearance, surface texture, hardness, etc., of natural rock on existing architectural and decorative structures.

A further object of the present invention is to provide a product having an external surface affording the configuration and feel of natural stone.

A further object of the present invention is to provide a method and product of the character described which is relatively light in weight, easy to apply and configure, and which is directly applied in situ to existing structures.

A still further object of the present invention is to provide a method of the character described which is easy and simple to perform and which requires no complicated or expensive machinery.

Yet another object of the present invention is to provide a method of the character described for closely simulating surface marks, colors, shadings, and configurations.

Still another object of the present invention is to provide a method and product of the character described for closely simulating stone which can be applied to an existing structure in a relatively thin layer.

Another object of the present invention is to provide a method and product of the character described which exhibits high compressive strength.

Yet another object of the present invention is to provide a method and product of the character described which exhibits high heat dissipation.

In accordance with the foregoing objects, the present invention includes an amorphous aqueous composition for use in forming a stone-like layer on the surface of a structure which comprises about one part by weight portland white cement, about 0.9 to 1.1 parts by weight white silica sand, about 1.8 to 2.2 parts by weight limestone sand, and about 0.9 to 1.1 parts by volume acrylic liquid solution, whereby one part acrylic liquid solution is about one gallon of the acrylic liquid solution per ten lbs of the white cement.

The aqueous composition is capable of being adhered to an exterior surface of a structure, and which, upon curing, solidifies into a layer of stone-like composition exhibiting high compressive strength.

In another aspect of the present invention, a method of forming a simulated stone surface on a structure is provided comprising the steps of: applying a layer of the above-mentioned amorphous aqueous composition over an exterior surface of the structure; shaping an outer surface of the aqueous composition layer to resemble a stone surface; and curing the aqueous composition to solidify into a layer of stone-like composition exhibiting high compressive strength.

The method and product of the present invention for forming an imitation stone surface on architectural structures provides an attractive and rich-looking surface on all kinds of architectural structures which closely simulates the appearance, wearability, and feel of genuine stone. This is accomplished by applying an amorphous layer of an aqueous composition to an architectural structure, configuring and coloring this coating to resemble a desired stone surface, and allowing the coating to set to a hard stone-like consistency. Normally, the aqueous composition is applied in one relatively thin layer over the exterior surface of the structure. In only about an eight hour period, the aqueous composition solidifies into a stone-like composition which exhibits high compressive strength.

The structure to which the aqueous composition is adhered to and applied is normally an architectural structure and may take a multitude of forms. Most common are existing walls, existing floors, fireplace mantels, arches, ceilings, and various ornamental architectural structures wherever the appearance of stone is desired. The surface of the coating can be made to simulate closely the appearance of almost any type of architectural stonework, and it is often difficult if not impossible on casual inspection to determine whether the surface is actually stone or is the product of the present invention.

The stone-like coating is extremely durable and weather-resistent, further enhancing its resemblance to actual stonework.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIG. 1 is a top perspective view of the amorphous aqueous composition constructed in accordance with one embodiment of the present invention shown applied over a floor surface.

FIG. 2 is a top perspective view of the amorphous aqueous composition of FIG. 1, and illustrating the employment of a template for forming a simulated stone-like appearance into the composition surface.

FIG. 3 is a perspective view of a wall, mantel and archway provided with the cured aqueous composition of FIG. 1 to simulate stone surfaces.

FIG. 4 is a fragmentary top perspective view illustrating how the underlayment is mounted on a typical existing architectural structure.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIG. 1 where an amorphous aqueous composition, generally designated 10, is illustrated partially applied atop an exterior surface 11 of an existing architectural structure 12, a floor in this instance. The aqueous composition comprises about one part by weight portland white cement, about 0.9 to 1.1 parts by weight white silica sand, about 1.8 to 2.2 parts by weight limestone sand, and about 0.9 to 1.1 parts by volume acrylic liquid solution, whereby one part acrylic liquid solution is about one gallon of the acrylic liquid solution per ten lbs of the white cement. The aqueous composition is capable of being adhered to an exterior surface of a structure, and, upon curing, solidifies into a layer of stone-like composition exhibiting high compressive strength between about 2800 psi to 3200 psi.

The simulated stone composition of the present invention is generally referenced in this specification in terms of weight ratios such that one part by weight white portland cement, white silica sand and limestone sand preferably refers to about a 100 lb bag of the same. Also in this specification one part by volume acrylic liquid solution is about 10 gallons of the acrylic liquid solution per 100 lbs (or one part) of the white cement. It will be appreciated, of course, that other weight and volume amounts, depending on the desired end-use application, can be used as long as the weight ratios (i.e., portland cement, white silica sand and limestone sand) and volume ratios (i.e., acrylic liquid solution) are substantially the same.

In accordance with the present invention, the aqueous composition solidifies into a "stone-like" composition far more realistic in appearance than the prior art simulated stone surfaces applied over existing architectural structures. Due in part to the use of natural limestone sand and white silica sand, rather than any aggregate sand or rock, together with the portland white cement, the texture and appearance (i.e., patina) of the solidified composition is more authentic, and hence, "stone-like".

That is, the natural graininess of the limestone is retained and not melded into the setting or bonding agent. Limestone has been found to be ideal for simulated stone compositions, since the grain-like texture and appearance are those of real limestone.

Since the specific internal bonding agents employed in the present invention do not substantially detract from the texture and color of the limestone, the general coloring, and/or graininess texture of the stimulated surface can be altered by employing a different color limestone, or that with a different grain mesh. Moreover, through proper coloring and shading and sculpting, the solidified composition can be made to authentically resemble the patina of weathered limestone, flagstone or sandstone to name a few.

In the preferred form, the grain mesh of the limestone sand is between about 25 to 35 mesh, and more specifically about 30 mesh. This size grain mesh has been found particularly suitable because it achieves the authentic patina in very thin applications (i.e., about ⅛ inch thick to about ¼ inch thick, as an example). Further, while the aqueous composition of the present invention includes between about 1.8 to 2.2 parts by weight limestone sand relative to one part portland white cement by weight, the aqueous composition more specifically and preferably includes about 2.0 parts by weight limestone sand.

The limestone sand provided in the present composition includes a high percentage of carbonate. This high carbonate content has also been found to provide superior simulated stone characteristics than other aggregate sands for use in these applications. In the preferred embodiment, limestone sand having about at least 90% calcium carbonate (i.e., CaO, preferably 94%) has been found to provide even greater simulated stone authenticity. While it is known that a high CaO amount is beneficial for authenticity of simulated stone compositions, CaO has the adverse affects of decreasing the compressive strength of the solidified compositions. As will be described in greater detail below, the composition of the present invention enables a high compressive strength, while employing a calcium carbonate rich limestone sand for more authenticity.

The grain mesh of the white silica sand is preferably between about 55 to 65 mesh, and more specifically about 60 mesh, such as that provided by the CISCO BRAND®. Similarly, while the aqueous composition of the present invention includes between about 0.9 to 1.1 parts by weight white silica sand relative to one part portland white cement by weight, the composition more specifically and preferably includes about 1.0 part by weight white silica sand.

In accordance with the present invention, a liquid acrylic solution is provided as an internal setting or bonding agent for reaction with the portland white cement to bond the white silica sand and the limestone sand together. It has been found that the present combination results in a high compression strength composition while retaining the natural granular character or patina of the limestone sand and the silica sand. Unlike other simulated stone compositions or ordinary cement, the granular characteristics of the limestone sand and white silica sand are not melded together and overpowered by the internal bonding agent. This results in an exceptional and authentic stone-like appearance.

About one gallon of acrylic liquid solution per ten lbs of portland white cement is most beneficial in yielding an authentic stone-like composition while maintaining a high compressive strength. This liquid acrylic solution is preferably about one part by volume acrylic polymer liquid and about one to three parts by volume water, with the preferred ratio being about 1:1. One particular acrylic polymer emulsion employed is that commonly available under the tradename ACRYL-60® by THORO® System Products.

This high compressive strength of the cured aqueous composition enables a thinner application layer over architectural structure surfaces. A layer as thin as about ¼ inch to about two inches may be applied over a floor or other surface, while still providing sufficient compressive load support in most instances. Accordingly, the aqueous composition of the present invention may be easily applied over most surfaces without substantially altering or raising the surface level of the structure. This is advantageous where such an extreme height alteration might otherwise preclude such an application.

Moreover, the aqueous composition of the present invention has been found to set or cure faster than the prior art simulated stone compositions. In only about an eight hour period, the aqueous composition solidifies into a stone-like composition which exhibits high compressive strength. This relatively swift curing period allows most floor applications or the like to be completed in a day or less.

Once the aqueous composition has been mixed or formulated as set forth above, the formulation is preferably sprayed or troweled onto an existing architectural structure 12. As shown in FIG. 1, the aqueous composition 10 is spread to a relatively thin layer about ⅛ inch thick to about two inches thick (preferably about ¼ inch thick to about ½ inch thick), depending upon the desired "stone-like" depth dimensions to be sculpted in the surface.

Upon partial setting or curing of the thin layered aqueous composition 10, the composition coating surface 13 is sculpted to provide a desired surface configuration closely simulating the desired stone. The present composition is capable of being sculpted to imitate natural pits and cracks in natural stone surfaces, or to provide grooves 14 between assembled individual stones. For example, as shown in FIGS. 2, 3 and 4, the partially cured composition 10 can be sculpted to simulate assembled stones, stone wall slabs or the like.

When the resulting sculpted product is intended to resembled cut stone slabs walls (FIGS. 3 and 4), the partitions or joints 15 between the slabs 16 may be simulated by manual carving of the joints with a tool (not shown). Another approach employed is to form or impress a pattern of joints or grooves 14 (FIG. 2) into the composition surface 13 before the coating or layer fully sets hard.

One method of forming a pattern of joints may be to provide a preformed template 17 formed to be placed atop the surface of the layered, partially cured aqueous composition. This composition is then troweled or spread into the spacings of the template 17 (manually or through the aid of a tool), and then the template is removed therefrom to form grooves 14 defining a jointed surface resembling assembled natural stones. Template 17 is preferably composed of a flexible polyurethane material or the like which is easily pulled up off the surface of the coating. Further, the template may be used continuously for multiple applications.

Subsequently, the workable and settable aqueous composition coating 10 is allowed to harden for about fifteen minutes to about twenty minutes to a solid but not fully set state. Thereupon, the surface 13 of the aqueous composition coating 10 is scraped with a tool, such as the straight edge of a trowel, to expose and texture the limestone sand and silica sand aggregate to more genuinely simulate a granular stone surface. This scraped surface may additionally be texturized by a disk sander or the like to form the desired patina. Alternatively, the surface of the hardened composition may be buffed and polished to simulate a polished stone surface.

As an option, the appearance and color of natural stone can be provided by applying a settable color coat to the surface of the hardened coating and then allowing the color coat to set and harden. A suitable color coat comprises one part white portland cement, plus one part non-reemulsifiable bonding admixture, such carboxylated butadiene styrene co-polymer latex admixture, or concrete adhesive glue, plus color pigment as desired. For realism, the pigment is preferably iron-based. The color coat is usually applied in a plurality of layers, and shading colors are applied to the color coat after the color coat has set hard.

The color coat is allowed to set and dry at least overnight. Quite often, portions of the color coated surface will look faded, and the color is brought back to these portions by spraying with a mixture of about one part of linseed oil to about two parts of paint thinner.

The formed grooves 14 or carved joints 15 are then filled with grout 19 (FIG. 4), and a layer of sealer is applied. This sealer should be capable of setting very hard, but should be non-glazing.

One advantage of the present invention is that the aqueous composition is very easy to mix and apply. This composition is very suitable to provide as a premixture whereby the applier only need add the proper amount of liquid acrylic solution. Moreover, proper sculpting techniques can be easily developed after a few applications. This ease of application of the present invention enables most people to apply the aqueous composition with minimal ability, while obtaining exceptional results. Hence, time consuming training schools or workshops can be avoided.

Another advantage is that the cured aqueous composition of the present invention has been found to exhibit high heat dissipation properties. This is particularly beneficial on relatively hot days where the simulated stone surfaces have been exposed to direct sunlight for extended periods of time. The composition is capable of dissipating substantial heat so that the simulated stone surfaces are comfortable and relatively cool to the touch.

underlayment while the underlayment is still substantially wet and tacky. This encourages better bonding between the underlayment and the aqueous composition, which enhances adherence of the cured coating to the architectural structure.

For a relatively non-porous architectural structure surface 11, such as concrete or tile, a cement based patching compound has been found to provide exceptional adherence for the aqueous composition of the present invention. The preferred liquid bonding agent is THOROPATCH® by THORO® System Products which is a two-component

TABLE I

| PLACE/STRUCTURE | 1ST TEMP (°F.) | 2ND TEMP (°F.) | 3RD TEMP (°F.) | 4TH TEMP (°F.) | 5TH TEMP (°F.) | AVERAGE (°F.) |
| --- | --- | --- | --- | --- | --- | --- |
| Ambient Air | 83.2 | 83.0 | 84.9 | 84.3 | 83.6 | 83.8 |
| Redwood Deck | 110.2 | 125.4 | 129.1 | 119.1 | 128.6 | 122.5 |
| Red Brick Coping (CURED COMPOSITION) | 114.0 | 118.1 | 116.6 | 114.3 | 114.6 | 115.5 |
| Steps | 92.1 | 91.8 | 95.9 | 94.1 | 97.1 | 94.2 |
| Walkway | 86.5 | 84.7 | 85.1 | 84. | 85.5 | 85.3 |
| Pool Deck | 90.6 | 93.1 | 98.4 | 90.2 | 95.6 | 93.6 |

TABLE II

| PLACE/STRUCTURE | 1ST TEMP (°F.) | 2ND TEMP (°F.) | 3RD TEMP (°F.) | 4TH TEMP (°F.) | 5TH TEMP (°F.) | AVERAGE (°F.) |
| --- | --- | --- | --- | --- | --- | --- |
| Ambient Air | 89.3 | 88.7 | 91.1 | 90.6 | 89.9 | 89.9 |
| Aggregate Concrete Pool Deck | 104.4 | 109.4 | 112.5 | 112.4 | 113.6 | 110.5 |
| Red Brick Coping (CURED COMPOSITION) | 113.4 | 116.6 | 120.8 | 120.1 | 115.1 | 117.2 |
| Pool Deck | 98.9 | 94.1 | 92.2 | 93.2 | 89.2 | 93.5 |

As shown in the test examples of TABLES I and II above, the cured aqueous compositions of the present invention were able to maintain a surface temperature more similar to the outside ambient air temperature, as compared to other composite structures or materials in close proximity to the cured compositions which exhibited much higher temperatures. All structure surface temperatures were measured while situated in the direct sunlight, and all temperatures were measured using a FLUKE® Digital Thermal-Coupler Measuring Device.

It is believed that the increased heat dissipation properties of the present invention are caused by its reflective nature, as well as its ability to transmit the absorbed sunlight energy therethrough, by conduction, to the underlying architectural structure. In the tests performed, the underlying structure was an aggregate concrete floor having a four inch thickness. Due to the relatively thin layer of cured aqueous composition, about ¼ inch to about ½ inch, the absorbed sunlight energy is easily conducted to the thicker (four inches) underlying aggregate concrete surface which forms a much better heat sink.

In the preferred embodiment, a liquid bonding agent underlayment layer 20 (FIG. 1) may be employed between the architectural structure surface 11 and the aqueous composition 10 to enhance bonding therebetween. This underlayment layer 20 is preferably applied in a thin layer over the structure surface 11 about ⅛ inch to about 1/16 inch thick.

After application of the underlayment material, the aqueous composition coating 10 may be applied directly over the patching compound normally applied in a patching capacity for concrete and masonry. This material, however, has been found to work well with the aqueous composition of the present invention to aid adherence to the structural surface.

Similarly, for semi-porous architectural structure surfaces, such as plaster walls, the preferred liquid bonding agent is THOROBOND® also by THORO® System Products.

In an alternative embodiment of the present invention, a silica sand based waterproofing admixture compound is included in the aqueous composition to aid sealing of the cured aqueous composition against the penetration of water or liquid. This waterproofing admixture, however, has been found to significantly increase the compressive load strength to between about 4500 psi to about 5000 psi, an increase far more substantial than with common concrete compositions.

The waterproofing admixture is preferably provided between about 0.01 to 0.03 parts by weight waterproofing compound per one part by weight of portland white cement, and more preferably about 0.02 parts by weight silica sand based waterproofing compound per one part by weight of portland white cement. One such particular waterproofing compound which has yielded exceptional compressive strength increases is the XYPEX® CONCENTRATE ADMIX C-2000 provided by the XYPEX® CHEMICAL CORPORATION.

TABLE III

|  | CURED AQUEOUS COMPO- SITION SPECIMEN | CURED AQUEOUS COMPOSITION SPECIMEN WITH 2% BY WEIGHT WATERPROOF COMPOUND ADMIXTURE |
| --- | --- | --- |
| Aged (Days) | 28 | 28 |
| Dimensions (in.) | 4.0 × 3.93 × 2.0 H | 4.0 × 3.88 × 2.0 H |
| Surface Area (sq. in.) | 15.72 | 15.52 |
| Ultimate Load (lbs.) | 48,220 | 72,110 |
| Compressive Strength (psi) | 3,070 | 4,650 |

As shown in the test examples of TABLE III, the silica sand based waterproof compound significantly increased the compressive strength by more than 50%, an increase not typically found with these concrete waterproofers.

It is believed that the high carbonate content of the limestone sand reacts favorably with the waterproofing compound causing catalytic reactions which accelerate the non-soluble crystalline formation. This results in increased compressive strength of the cured composition.

In another aspect of the present invention, a method of forming a simulated stone surface on a structure is provided comprising the steps of: applying a layer of the above-mentioned amorphous aqueous composition over an exterior surface of the structure; shaping an outer surface of the aqueous composition layer to resemble a stone surface; and curing the aqueous composition to solidify into a layer of stone-like composition exhibiting high compressive strength. The curable amorphous aqueous composition comprises about one part by weight portland white cement, about 0.9 to 1.1 parts by weight white silica sand, about 1.8 to 2.2 parts by weight limestone sand, and about 0.9 to 1.1 parts by volume acrylic liquid solution, whereby one part acrylic liquid solution is about one gallon of the acrylic liquid solution per ten lbs of the white cement.

The method of the present invention further includes the step of applying a thin coating of a porous underlayment on the surface, and bonding the coating with the underlayment. The shaping step is carried out by forming a pattern of grooves 14 with template 17 into an outer surface of the aqueous composition to simulate an assembly of individual stones. After curing, the method may include filling the grooves with grout.

The applying step may be accomplished by spraying the amorphous aqueous composition onto the surface through the pressurized aid of a stucco-type gun (for denser packing), or through troweling the coating of composition over the surface of the structure to a thickness of less than ⅛–¼ inch. The method of the present invention further includes the step of providing to the aqueous composition a waterproofing compound of about 0.010 to 0.03 parts by weight waterproofing compound per one part by weight of the white cement causing the aqueous composition to solidify into said stone-like composition exhibiting increased compressive strength between about 4500 psi to 5000 psi.

As shown FIGS. 1, 3 and 4, the coating 10 can be applied over and is bonded to the exterior surface 11 of the architectural structure 12 in covering relation thereto. The architectural structures to which the aqueous composition coating is applied constitutes existing walls, existing floors, existing structural features such as fireplace mantels, and various ornamental architectural structures.

When the underlying structure has a non-porous surface, a prefabricated underlayment such as dry wall 21 (FIG. 3) or light-weight cellular concrete blocks 22 (FIG. 4) cut to needed shapes are fastened to such structures in position to receive the aqueous composition coating 10. The prefabricated underlayment adapted to set rock hard and to provide a porous outer surface to which the aqueous composition coating 10 is applied.

FIG. 3 illustrates that the aqueous composition coating 10 can be further sculpted with engraved portions 23, escutcheons 24, base relief plaques 25 and the like, recessed panels 26, recessed alcoves 27, and arches 28 and 29.

What is claimed is:

1. An amorphous aqueous composition forming a stone-like layer on the surface of a structure, said composition comprising:

about one part by weight portland white cement, about 0.9 to 1.1 parts by weight white silica sand, about 1.8 to 2.2 parts by weight limestone sand, and about 0.9 to 1.1 parts by volume of an internal bonding agent comprising an acrylic liquid solution which polymerizes in the presence of the white cement effective to bond the white silica sand and limestone sand together, whereby one part acrylic liquid solution is about one gallon of said acrylic liquid solution per 10 lbs of said white cement;

said aqueous composition being capable of adhering to said surface on the structure, and solidifying into a layer of stone-like composition exhibiting high compressive strength.

2. An aqueous composition as defined in claim 1 wherein said acrylic liquid solution is comprised of about one part by volume acrylic polymer liquid and about one to three parts by volume water.

3. An aqueous composition as defined in claim 2 wherein the ratio, by volume, of said acrylic polymer liquid to water is about 1:1.

4. An aqueous composition as defined in claim 1 further including:

about 0.010 to 0.03 parts by weight waterproofing compound per one part by weight of said white cement sufficient to cause said aqueous composition to solidify into said stone-like composition exhibiting increased compressive strength between about 4500 psi to 5000 psi.

5. An aqueous composition as defined in claim 4 wherein said waterproofing compound is about 0.02 parts by weight per one part by weight of said white cement.

6. A stone-like layer applied to the surface of a structure, said layer comprising a porous underlayment applied on said surface, and a coating bonded to said underlayment, said coating comprising the product cured from a curable amorphous aqueous composition which comprises about one part by weight portland white cement, about 0.9 to 1.1 parts by weight white silica sand, about 1.8 to 2.2 parts by weight limestone sand, and about 0.9 to 1.1 parts by volume of an internal bonding agent comprising an acrylic liquid solution which polymerizes in the presence of the white cement effective to bond the white silica sand and limestone sand together, whereby one part acrylic liquid solution is about one gallon of said acrylic liquid solution per 10 lbs of said white cement;

said aqueous composition being capable of adhering to said surface on the structure, and solidifying into a layer of stone-like composition exhibiting high compressive strength.

7. A stone-like layer as defined in claim 6 wherein said underlayment comprises a liquid bonding agent.

8. A stone-like layer as defined in claim 6 wherein said underlayment comprises a patching compound.

9. A method of forming a simulated stone layer on a the surface of a structure comprising the steps of:

applying a coating of a curable amorphous aqueous composition over a surface of the structure, said aqueous composition comprising about one part by weight portland white cement, about 0.9 to 1.1 parts by weight white silica sand, about 1.8 to 2.2 parts by weight limestone sand, and about 0.9 to 1.1 parts by volume of an internal bonding agent comprising an acrylic liquid solution which polymerizes in the presence of the white cement effective to bond the white silica sand and limestone sand together, whereby one part acrylic liquid solution is about 1 gallon of said acrylic liquid solution per 10 lbs of said white cement;

shaping an outer surface of the aqueous composition layer to resemble a stone surface; and curing said aqueous composition to solidify into a layer of stone-like composition exhibiting high compressive strength.

10. A method as defined in claim 9 further including the step of:

applying a thin coating of a porous underlayment on said surface, and bonding said coating with the underlayment.

11. A method as defined in claim 10 wherein said underlayment comprises a liquid bonding agent.

12. A method as defined in claim 10 wherein said underlayment comprises a patching compound.

13. A method as defined in claim 9 wherein said aqueous composition further includes about 0.010 to 0.03 parts by weight waterproofing compound per one part by weight of said white cement causing said aqueous composition to solidify into said stone-like composition exhibiting increased compressive strength between about 4500 psi to 5000 psi.

* * * * *